United States Patent Office 3,618,330
Patented Nov. 9, 1971

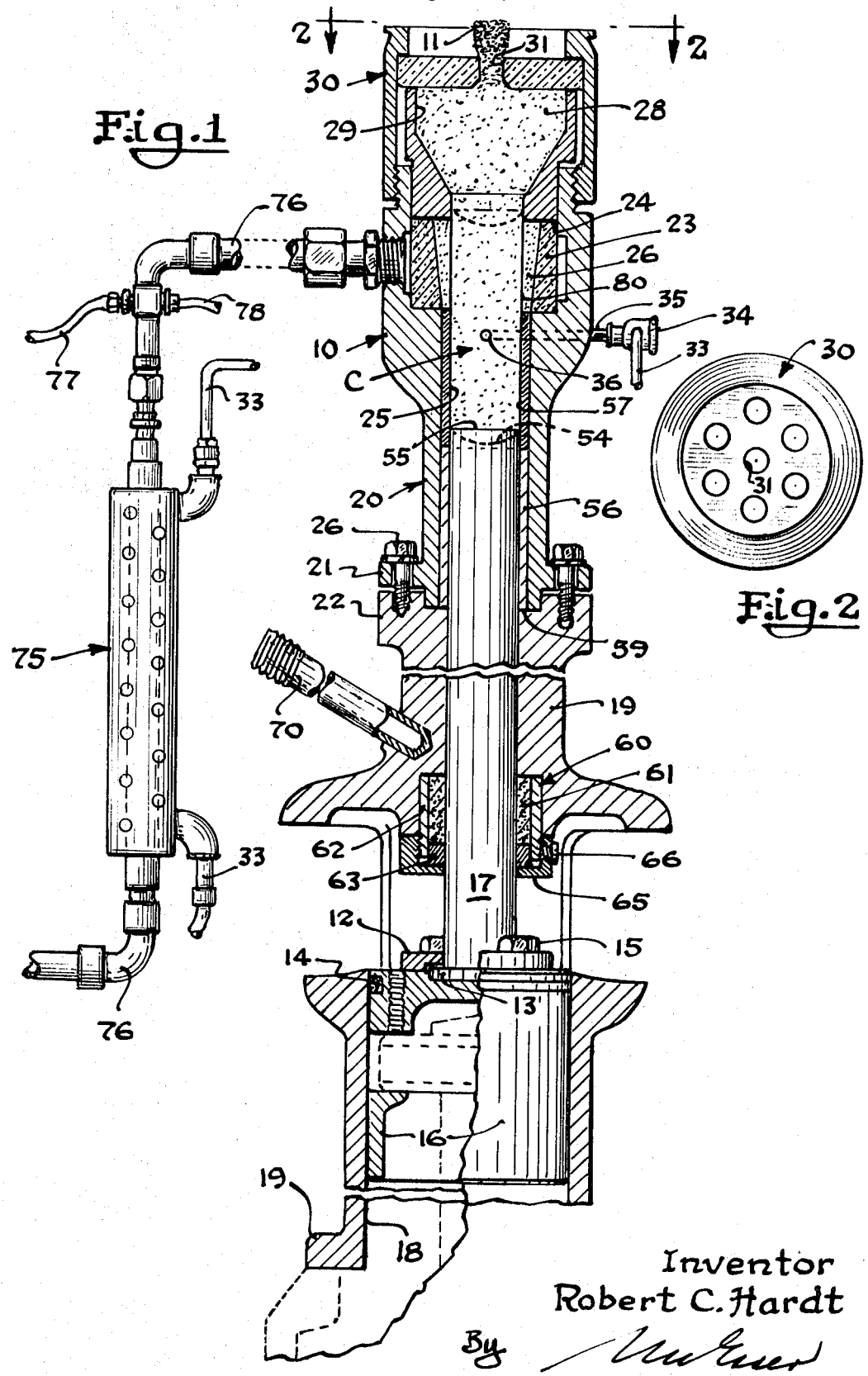

3,618,330
SOLIDIFIED GAS FILTER
Robert C. Hardt, Chicago Heights, Ill., assignor to
Chemetron Corporation, Chicago, Ill.
Filed Sept. 12, 1968, Ser. No. 759,419
Int. Cl. F25j 1/00, 3/00
U.S. Cl. 62—10               6 Claims

ABSTRACT OF THE DISCLOSURE

An apparatus and method of filtering solid gas particles from a gas stream wherein a liquefied gas such as liquid carbon dioxide is flashed into a closed chamber to form gas and a particulate snow-like material and some of the solid material is subsequently employes as a porous filter for the gas to separate the solid matter. The amount of said material employed as a filter is regulated to provide a constant pressure drop for the gas across the filter. The particulate solidified gas material after being filtered is subsequently compressed into pellets.

BACKGROUND OF THE INVENTION

This invention relates in general to a method and apparatus for filtering a solidified gas material from a gas stream and utilizing the solidified material as a filter for additional solid material. More particularly, this invention is concerned with pellet machines and a method of making liquefied gas pellets wherein the liquefied gas is flashed into a gas and a solid material and the solid material used to retain and confine the solidified gas for subsequent compression into pellets.

In application Ser. No. 500,426 filed Oct. 21, 1965 and entitled "Method and Apparatus for Making Pellets" in which the present inventor is a joint inventor, a pellet machine is disclosed wherein pellets are formed from a liquefied gas such as carbon dioxide by flashing the liquefied gas into a closed chamber resulting in a gas and solid material. A reciprocating type plunger is disclosed in the pellet machine and a sintered metal filter is described for separating the solid particles from the gas material in the gas stream for subsequent compression by the plunger. In that apparatus close tolerances are maintained between the plunger and the filter. The same is true concerning application Ser. No. 660,790 filed Aug. 15, 1967 entitled "Solidified Gas Pellets and Apparatus for Manufacturing" where the present inventor is also a joint inventor and wherein that particular application describes a unique carbon dioxide pellets and an apparatus for forming same. A problem confronting machines of the type previously mentioned is the maintenance of the filter in close proximity to the reciprocating plunger. If a metal filter which is commonly used comes into contact with the plunger either because of a poor fitting or vibration, the filter becomes damaged and particles of the metal filter are compressed into the solid carbon dioxide pellets. Another problem confronting the use of a filter in pellet machines of the type concerned with in this invention is the maintenance of a constant pressure drop across the filter so that a closed system return for the exhaust gas is not subjected to increased resistance as additional material is compressed.

In U.S. Pats. 2,999,364 and 3,162,517 devices are described for separating components from a gas or vapor mixture by solidifying them on a cooled surface whereby the solidified snow layer formed from the undesired material acts as a filter and allows the desired component to pass therethrough. Nowhere in the prior art is there provided a method or apparatus for advantageously employing the same substance in a compacted state to serve as a filter for the same substance in a gaseous state. Neither is there available a filter for solidified gas materials wherein the size of the filter and the pressure drop across it are regulated without substantial deviation.

It is an object of the present invention to provide an apparatus and method of forming a filter for solidified gas material. It is another object of the invention to provide a filter composed of solidified gas material which will filter the solidified gas and allow the same material in a gaseous state to pass therethrough. It is still another object of the present invention to provide a method and apparatus for forming a filter composed of a solidified gas, the size of which is regulated and maintained constant. It is yet another object of the invention to provide a novel filter in a solidified gas pellet machine wherein the flow resistance of the filter is maintained constant by the same plunger which compresses the solid material to form pellets.

SUMMARY OF THE INVENTION

The foregoing objects are accomplished and the shortcomings of the prior art are overcome by forming a filter member from slightly compacted solidified gas material. The solidified gas is deposited intermittently under slight pressure on a filter surface which is sheared intermittently to maintain a constant size for the filer and consequently the same pressure drop for the gas material through the filter as well as providing constantly a new filter surface. In another phase but as part of the same cycle, the filtered solidified gas is compressed into pellets which are extruded from a die.

BRIEF DESCRIPTION OF DRAWING

A better understanding of the process of this invention will be accomplished by reference to the drawing describing a preferred apparatus for effecting such method wherein:

FIG. 1 is a view in vertical section with parts broken away of a pellet machine which accomplishes the method of this invention and also a view of a heat exchanger in side elevation shown broken away from the pellet machine.

FIG. 2 is a view in horizontal section taken along line 2—2 of FIG. 1.

DESCRIPTION OF THE PREFERRED EMBODIMENTS

Briefly stated, the apparatus shown in the drawing carries out the method of the present invention by flashing liquefied gas into a closed compression chamber such as a piston chamber to form gas and particulate snow like material. A filter surface is disposed adjacent the piston chamber and the flashing of the liquefied gas into the chamber deposits some of the particulate snow material on the filter. The filter serves to separate the gas from the snow with the gas being returned through a closed system to a liquefication zone. The amount of snow material deposited on the filter is regulated by the compression plunger which passes over the filter with a shearing effect to maintain a constant amount of material and consequently maintains a constant pressure drop across the filter. This intermittent shearing is effected by the plunger as it travels toward and away from an extrusion head disposed transversely to the end of the piston. The filter is placed preferably in a coaxial manner with respect to the plunger and in any event laterally thereto so that no direct compression force of the plunger is transmitted to it. To assure minimum compression on the filter, the travel of the plunger is designed to terminate in its extended position over and beyond the filter surface.

Referring now to the drawing there is shown an apparatus generally indicated at 10 for making pellets for example pellets 11 of solid carbon dioxide. The apparatus 10 in its overall operation is generally similar to that described in the previously referred to copending patent applications Ser. Nos. 500,426 and 660,790 except for the type filter employed. Any suitable drive mechanism can be used having the usual crank shaft and connecting rod attached to a guide 16 which is mounted for reciprocation in a bore 18 in block 19. As guide 16 is reciprocated in bore 18 ram 17, rigidly secured to the upper surface of guide 16 by means of plunger retainer 12 engaging an enlarged portion 13 on ram 17 and secured thereto by cap screws 15, is in turn reciprocated. An oil ring 14 provides the necessary seal for guide 16 in bore 18.

A cylindrical member or casing 20 is secured to block 19 by screws 26 and flanged connecting portions 21 and 22 formed on casing 20 and block 19, respectively. The cylinder member 20 receives a porous separator or filter 23 which is preferably composed of sintered bronze and is supported in the enlarged upper portion 24 of casing 20. Filter 23 is preferably of trapezoidal configuration in cross section and is disposed a predetermined distance outwardly from and coaxially to bore 25 of casing 20. This spacing allows for the depositing of slightly compacted carbon dioxide snow 26 to be deposited on filter 23 with filter 23 thereby serving as a matrix for the snow. Plug 28 of solid carbon dioxide snow is partly formed in bore 25 of casing 20 and partly in bore 29 of head 30. The head 30 has a plurality of small bores or openings 31 of the converging diverging type described in application Ser. No. 660,790 which communicates with bore 29.

A conduit 33 communicates with a standard insulated carbon dioxide storage tank (not shown) and a valve assembly 34 of the electrical type. A cooling coil, compressor, pressure regulator and liquid and vapor separator (not shown) for supplying carbon dioxide liquid through conduit 33 are standard and are described in copending application Ser. No. 500,426. Carbon dioxide liquid is conveyed through valve 34 into bore 25 of casing 20 by means of conduit 35 in communication with orifice 36.

The stroke of the ram extends from the upper position shown in broken lines at the lower end of plug 28 to the lower portion of bore 25 as shown in solid lines. The upper end of the ram 17 has a recess 54 which terminates in a sharp peripheral edge 55. Bearings 56 and 57 form part of the internal bore 25 and are disposed in abutting relationship with bearing 56 resting on internal shoulder 59. The bearings are preferably composed of polytetrafluoroethylene commonly known commercially as Teflon. Encircling ram 17 is a packing set generally 60, sold under the trade name Chemlon, composed of packing 61 encircled by packing gland sleeve 62 which also surrounds a back up ring 63. A packing gland nut 65 threadably engages sleeve 62 and provides for threaded engagement with set screw 66 for securing nut 65 on sleeve 62.

A heater receptacle 70 is disposed in block 19 and preferably receives a standard 50 watt heater. Its purpose is to prevent freezing of plunger rod 17 through its contact with packing 61 or bearings 56 and 57.

A heat exchanger generally 75 of the tube in shell type has a conduit 76 in communication with enlarged upper portion 24 of casing 20 with the opposite end of conduit 76 being connected ultimately with a compressor and cooling coil for reliquefication of the carbon dioxide vapor. As indicated previously, conduit 33 communicates at one end with valve 34 and at the opposite end with a source of carbon dioxide liquid. Conduit 77 conveys vapors from a standard float valve which removes them from the carbon dioxide liquid entering the machine and conveys it into line 76. Conduit 78 leads to a pressure gauge which indicates any blockage in the vapor handling system.

OPERATION

A better understanding of the advantages of the present method and apparatus will be had by a description of pellet machine 20. A suitable drive mechanism will continuously reciprocate ram 17 by means of guide 16, the drive mechanism and valve mechanism 34 being in synchronism so that liquid carbon dioxide from conduit 33 is flashed into bore 25 and chamber 24 when the head of ram 17 passes orifice 36 on its downward stroke and ceases the flashing of liquid carbon dioxide when the head of ram 17 begins its upward stroke. The operation of valve 34 and the drive mechanism is substantially the same as that disclosed in copending application Ser. No. 500,426. The snow accumulates in the chamber designated by the letter "C" and some of the snow is deposited on the already existing surface 80 of slightly compacted snow 26. At the start up of the pellet machine 20 it will be appreciated that no snow such as 26 will be present on matrix filter 23. However, with liquid carbon dioxide being flashed into bore 25 at a pressure of about 60 p.s.i.g., snow will accumulate in the area between matrix 23 and integral bore 25 accommodating plunger 17 as shown at 26. As ram 17 moves upwardly, the sharp peripheral edge 55 will engage snow 26 extending into bore 25 and shear it. Simultaneously, ram 17 as it moves upwardly toward head 30 will move the snow "C" toward the head and progressively compress it. Some of the solid carbon dioxide which constitutes the plug 28 is forced through the openings or bores 31 with some of the solid carbon dioxide remaining in the bores and newly compressed snow constituting a plug 28 as the stroke cycle of ram 17 is repeated. During the upward stroke of ram 17 carbon dioxide vapor will also be compressed and vented through slightly compressed snow 26 forming a filter on matrix 23. The carbon dioxide vapor passes from chamber 24 through filters 26 and 23 into outlet conduit 76 and subsequently to a storage chamber for reuse. By means of heat exchanger 75 the sub-cooled vapor exiting through outlet 76 will come into heat exchange relationship with incoming liquid in conduit 33. This provides a sub-cooling of the incoming liquid and eliminates the need for a circulating loop system to provide the liquid. By having plug 28 in bore 29 carbon dioxide vapor is sealed from atmosphere and passes through gas vent conduit 76, heat exchanger 75 returning ultimately to valve 34 in a liquid form.

It is apparent that with each stroke of ram 17 toward head 30 some solid carbon dioxide is deposited intermittently on the filter surface 80 and subsequently and intermittently removed. The removed solid material along with additional solid carbon dioxide is forced through openings 31 and rod like pellets are made.

With the intermittent depositing of solid carbon dioxide on surface 80 and the intermittent shearing of the surface by ram 17 it will be seen that a filter 26 of constant thickness is effected. This provides a constant pressure drop for the carbon dioxide vapor in chamber 25 as it passes through filters 26 and 23 and into outlet conduit 76. Not only is a filter provided with a constant thickness but a renewed filter surface 80 is constantly provided as the peripheral edge 55 of ram 17 shears intermittently filter 26. Also, it is surmised that the outer edge of filter 26 sublimes, causing the slow outward advance of the material. Since the circumference increases as a layer moves outward, radial cracks occur and enlarge outwardly from the working internal diameter surface of 26. These cracks do increase the ease of vapor flow, making an external round filter superior to an interior round filter or a flat filter. By having matrix 23 disposed coaxially with ram 17 and spaced a slight distance therefrom, no direct compacting of the solid carbon dioxide is effected on matrix 23 or filter 26. This is further assured by having ram 17 complete its upward stroke through and beyond the limits of chamber 24 and filters 23 and 26.

Matrix 23 and consequently filter 26 are shown as having a trapezoidal cross section. However, they can have any geometric configuration, the main factor being that matrix 23 is spaced a sufficient distance outwardly from bore 25 so that sufficient snow can accumulate between bore 25 and matrix 23 to form snow filter 26.

Although the invention has been described as being practiced with carbon dioxide to form solid and vapor and the solid material employed as a filter for the vapor, it will be understood that any liquefied gas which will flash to both a solid and vapor below its triple point pressure can subsequently be formed into pellets such as 31 when employing a matrix 23 and a head member 30 in a piston or ram type pellet machine.

The matrix 23 employed in the present invention is composed of sintered bronze. However, any porous material such as sintered stainless steel, perforated metal, woven wire screen, and the like could be employed in its place.

It will thus be seen that through the present invention there is now provided a process for separating a solid material from a vapor of the same material by employing the solid material as a filter. The size of the filter is constantly regulated and its surface intermittently renewed for optimum operation. The material sheared from the filter surface is subsequently employed by being compressed into pellets. The vapor is reusable as it is kept from contamination by atmosphere in a closed chamber which is sealed from the atmosphere by a solid plug in a head member. No special precautions need be taken in fitting the matrix on which the solid filter material is originally deposited. By having the matrix spaced from the bore in which the ram reciprocates, any possible contact between the ram and the matrix is eliminated. The method and apparatus of the present invention can be employed in any type of pellet machine without extensive modifications or any special tooling.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

I claim:

1. Apparatus for making carbon dioxide pellets comprising a chamber adapted to confine carbon dioxide snow except for at least one opening of substantially reduced cross section relative to the chamber, means for flashing liquid carbon dioxide to cause carbon dioxide snow and gas to fill the chamber, means for venting carbon dioxide gas from the chamber, means including a ram reciprocable within the chamber for compressing the snow in the chamber to force a substantial portion of the compressed snow through the opening and to form a seal at the opening from the remainder of the compressed snow, and means for filtering the snow from the gas and depositing the separated snow in the chamber, said filtering means including a porous matrix disposed substantially around an axis of the chamber adjacent the path of the ram between the means for flashing and the means for venting and configured to at least substantially surround the ram during reciprocation of the ram and a porous layer of solidified carbon dioxide disposed against the matrix to be sheared by reciprocation of the ram.

2. The apparatus of claim 1 wherein the matrix is generally tubular and at least partially surrounds the ram during reciprocation of the ram.

3. The apparatus of claim 2 wherein the matrix is generally trapezoidal in cross section.

4. The apparatus of claim 2 wherein the ram is generally cylindrical and has a sharp peripheral edge at a recessed end.

5. Apparatus for making carbon dioxide pellets comprising a chamber adapted to confine carbon dioxide snow except for at least one opening of substantially reduced cross section relative to the chamber, means for flashing liquid carbon dioxide to cause carbon dioxide snow and gas to fill the chamber, means for venting carbon dioxide gas from the chamber, means including a ram reciprocable within the chamber for compressing the snow in the chamber to force a substantial portion of the compressed snow through the opening and to form a seal at the opening from the remainder of the compressed snow, and means for filtering the snow from the gas and depositing the separated snow in the chamber, said filtering means including a porous matrix disposed substantially around an axis of the chamber adjacent the path of the ram between the means for flashing and the means for venting and configured to at least substantially surround the ram during reciprocation of the ram, said matrix being spaced from the path of the ram such that a porous layer of solidified carbon dioxide remains disposed against the matrix to be sheared by reciprocation of the ram with snow in the chamber.

6. A method of making carbon dioxide pellets in a chamber adapted to confine carbon dioxide snow except for at least one opening of substantially reduced cross section relative to the chamber, a ram being reciprocable within the chamber for compressing carbon dioxide snow in the chamber, comprising the steps of depositing a layer of solidified carbon dioxide snow against a porous matrix disposed substantially around an axis of the chamber, said matrix being configured to at least substantially surround the ram during reciprocation of the ram, forming a seal of solidified carbon dioxide at the opening, flashing liquid carbon dioxide to cause carbon dioxide snow and gas to fill the chamber while filtering the snow and gas in the chamber against the porous layer of solidified carbon dioxide snow to separate said gas from said snow and while venting the separated gas from the chamber to deposit the separated snow in the chamber, and shearing the porous layer of solidified carbon dioxide while compressing the snow in the chamber to force a substantial portion of the compressed snow through the opening and reform the seal of solidified carbon dioxide from the snow remaining in the chamber.

References Cited

UNITED STATES PATENTS

| | | | |
|---|---|---|---|
| 1,894,892 | 1/1933 | Small | 62—35 |
| 1,912,445 | 6/1933 | Goosmann | 62—10 |
| 1,927,173 | 9/1933 | Jones | 62—10 |
| 2,153,629 | 4/1939 | Kobold | 62—10 |
| 2,999,364 | 9/1961 | Hellingman | 62—9 |
| 3,077,081 | 2/1963 | Schnoor | 62—10 |
| 3,162,517 | 12/1964 | Verbeek | 62—14 |

WILBUR L. BASCOMB, JR., Primary Examiner

A. F. PURCELL, Assistant Examiner

U.S. Cl. X.R.

62—35